Patented May 1, 1923.

1,453,984

UNITED STATES PATENT OFFICE.

RALPH AUSTIN LONG, OF TAMAQUA, PENNSYLVANIA, ASSIGNOR TO ATLAS POWDER COMPANY, OF WILMINGTON, DELAWARE, A CORPORATION OF DELAWARE.

MANUFACTURE OF AMMONIUM PERCHLORATES.

No Drawing.     Application filed November 26, 1921.   Serial No. 517,889.

*To all whom it may concern:*

Be it known that I, RALPH AUSTIN LONG, a citizen of the United States, residing at Tamaqua, in the county of Schuylkill and State of Pennsylvania, have invented certain new and useful Improvements in the Manufacture of Ammonium Perchlorates, of which the following is a specification.

My invention relates particularly to the manufacture of ammonium perchlorate from the double decomposition of sodium perchlorate and ammonium chloride.

The object of my invention is to provide a method, by which ammonium perchlorate of high purity is produced and in which the by-product sodium chloride is obtained in such form that it is unnecessary to recrystallize in order to remove valuable materials.

I have discovered a process in which the reaction between equivalent quantities of sodium perchlorate and ammonium chloride when added to a previously prepared nucleus solution, containing essentially the correct proportions of either sodium and perchlorate ions, or ammonium and chlorine ions, is such that comparatively pure sodium chloride separates out, hot. The concentration of the sodium chloride left in solution is sufficiently low that, after the portion which separates has been filtered off, the filtrate, upon the addition of from six to seven percent water, can be cooled to a temperature below 30° C.—resulting in a large yield of ammonium perchlorate of high purity. The mother liquor, after the dilution water has been evaporated off, forms again the above mentioned nucleus solution for the new cycle.

The process, in brief, depends upon the fact discovered by me that the proper excess of either sodium perchlorate or ammonium chloride is maintained in the solution throughout the reaction, thus producing the proper depression of the solubility of the sodium chloride at the high temperatures and of the ammonium perchlorate at the low temperatures due to the effect of the common ions in each case.

To a hot nucleus solution containing the correct proportions of ammonium perchlorate, sodium chloride and from one to six percent of either ammonium chloride or sodium perchlorate, is added sodium perchlorate and ammonium chloride in such amounts that the excess of either sodium perchlorate or ammonium chloride originally present in the nucleus solution is not disturbed. The existence of either one of these above mentioned salts in the hot solution depresses the solubility of the sodium chloride and causes more to separate out than ordinarily would. After filtering off the separated sodium chloride and adding a sufficient amount of dilution water to prevent any further separation of this salt, the solution is cooled. At the cooler temperatures, the presence of sodium perchlorate or ammonium chloride in the solution depresses the solubility of the ammonium perchlorate, resulting in a larger yield of product at these temperatures. In both cases this effect is due to the existence of the common ions. In the first case it is due to the presence of the common ions, sodium and perchlorate. In the second case it is due to the presence of the common ions, ammonium and chlorine.

As an example, I may state that the process may be carried out by employing a nucleus solution containing approximately 9% to 12% ammonium perchlorate, 1% to 7% sodium perchlorate, and 17% to 22% sodium chloride, adding to this the proper amount of sodium perchlorate and ammonium chloride to produce a solution containing 18% to 30% ammonium perchlorate, 1% to 7% sodium perchlorate, and 17% to 22% sodium chloride, removing the sodium chloride that separates out, diluting the remaining liquid and then removing the ammonium perchlorate at a temperature below 30° C.

In case $NaClO_4$ is to be used in excess, a nucleus solution is prepared at 100° C. to contain 11.8% $NH_4ClO_4$, 3.6% $NaClO_4$, and 20.0% $NaCl$. To this solution is added the proper amounts of $NaClO_4$ and $NH_4Cl$ to produce a solution containing 25% $NH_4ClO_4$, 3.8% $NaClO_4$, and 17.5% $NaCl$, and the $NaCl$ that separates out at this temperature is removed. The filtrate is diluted with about 6% water and cooled to 20° C. when the $NH_4ClO_4$ is removed. The mother liquor is then concentrated until it contains approximately the same amount of dissolved salts as the original nucleus solution.

In case $NH_4Cl$ is used in excess, a nucleus solution is prepared at 100° C. to contain 12.5% $NH_4ClO_4$, 1.6% $NH_4Cl$, and 22.0% NaCl. To this solution is added the proper amounts of $NaClO_4$ and $NH_4Cl$ to produce a solution containing 26% $NH_4ClO_4$, 1.6% $NH_4Cl$, and 18.9% NaCl. The NaCl that separates out at this temperature is removed and the filtrate treated in the same manner as above. The mother liquor is then concentrated until it contains the same amount of dissolved salts as in the original nucleus solution.

While I have given examples it should be understood that I do not limit myself to these proportions or temperatures, but find that good results can be obtained when using a solution in which the percentage of $NH_4ClO_4$ varies from 18% to 30% and that of $NaClO_4$ or $NH_4Cl$ varies from 1% to 7%.

At the same time the nucleus solution may be prepared at temperatures between 75° C. and 100° C. and the ammonium perchlorate removed at any temperature below 30° C.

Having described my invention, what I claim is:

A process for the manufacture of ammonium perchlorate which consists of employing a nucleus solution containing approximately 9% to 12% ammonium perchlorate, 1% to 7% sodium perchlorate, and 17% to 22% sodium chloride, adding to this the proper amount of sodium perchlorate and ammonium chloride to produce a solution containing 18% to 30% ammonium perchlorate, 1% to 7% sodium perchlorate, and 17% to 22% sodium chloride, removing the sodium chloride that separates out, diluting the remaining liquid and then removing the ammonium perchlorate at a temperature below 30° C.

In testimony whereof I affix my signature in the presence of two witnesses.

RALPH AUSTIN LONG.

Witnesses:
A. J. STRANE,
F. N. FINN.